(12) United States Patent
Kawano (10) Patent No.: US 6,185,376 B1
(45) Date of Patent: Feb. 6, 2001

(54) CAMERA FOR RECEIVING A ROLL FILM HAVING AN IDENTIFICATION MARK

(75) Inventor: Kiyoshi Kawano, Saitama (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/276,655

(22) Filed: Mar. 26, 1999

(30) Foreign Application Priority Data

Apr. 3, 1998 (JP) ................................................. 10-091292

(51) Int. Cl.$^7$ .............................. G03B 7/00; G03B 7/24; G03B 1/02
(52) U.S. Cl. .......................... 396/210; 396/406; 396/410; 396/413; 396/538
(58) Field of Search .................................... 396/210, 411, 396/413, 418, 538, 406, 410

(56) References Cited

U.S. PATENT DOCUMENTS 5,918,083 * 6/1999 Aoki et al. .......................... 396/538

\* cited by examiner

*Primary Examiner*—Alan A. Mathews
(74) *Attorney, Agent, or Firm*—Greenblum & Bernstein, P.L.C.

(57) ABSTRACT

A camera using a roll film (Brownie film) having an identification mark, on one half of the width of the film strip, is provided with a pair of spool compartments in a camera body. The film can be loaded in one of the spool compartments. The film loaded in one spool compartment can be wound into the other spool compartment. The camera body is provided with a pair of code sensors, wherein at least one code sensor corresponds to the identification mark, regardless of the winding direction of said film.

18 Claims, 8 Drawing Sheets

CAMERA FOR RECEIVING A ROLL FILM HAVING AN IDENTIFICATION MARK

BACKGROUND OF THE INVENTION

1. Field of the Invention

The present invention relates to a camera (e.g. a medium-sized camera) which uses a Brownie film, and more precisely it relates to a camera having an automatic film winding mechanism.

2. Description of the related Art

Figure 9:
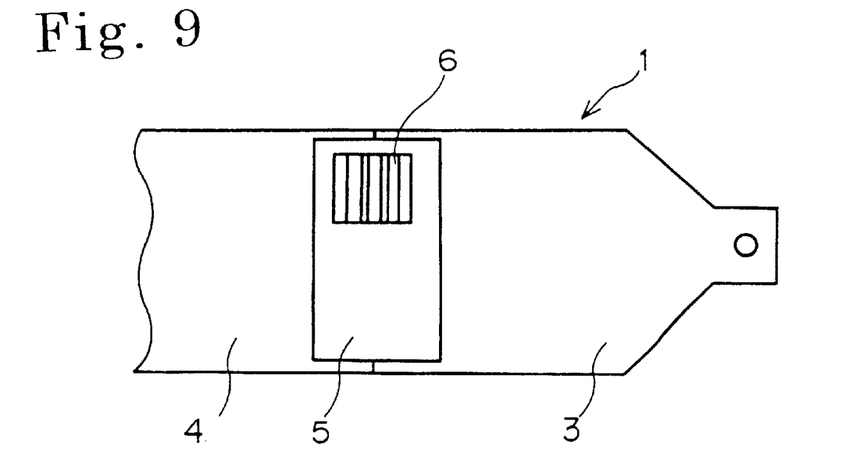
FIG. 9 is a schematic view of a leading end of a 120 film with a bar code.

A cartridge for a 135 roll film or an APS film is provided with an identification mark such as a DX code or bar code which represents data such as the kind of the film (120, 220), ISO speed, color or monochrome, etc. When the film is loaded, the camera reads the DX code or bar code, so that the film speed, etc., can be automatically set in accordance with the read data. In general, a medium size film including a Brownie film is not provided with such film data. However, recently a Brownie film having a bar code has been proposed. In the Brownie film as shown in FIG. 9 which shows a 120 film by way of example, a tape 5 which is adapted to connect a backing 3 and a leading end of the film 4 is provided with a bar code 6 printed on the surface of the tape 5. In a camera using a Brownie film, a sensor which reads the bar code 6 is provided with a camera body, so that the data read by the sensor is input to a controller which performs various setting operations to automatically set the film speed based on the bar code.

In a camera using a Brownie film, in order to load a new film in the camera after an old film whose frames have been all exposed is removed from the camera, a spool remaining in the camera is moved from a film loading compartment to a film winding compartment, so that the new film can be loaded in the vacant film loading compartment. Therefore, the movement of the film spool must be carried out for each film replacement, thus resulting in a troublesome film replacement process.

In an attempt to provide a camera in which the film winding direction can be changed, wherein a bar code sensor to read a bar code is provided so as to automatically set the film speed, etc., the following problem is raised: Namely, the bar code sensor cannot read the bar code 6 when the film is wound in the opposite direction (with the spools in reversed positions in reversed spool compartments), since the bar code 6 is located on the opposite (lower) half of the film 4 shown in FIG. 9. This makes it difficult to achieve a variable film winding direction camera in which various photographing data can be automatically set.

In the example mentioned above, the bar code 6 is provided with the outer surface of the tape 5 which connects the backing 3 and the leading end of the film 4. However, the bar code can be provided on the outer surface of the film 4 or the backing 3 in accordance with the type of the film, so the term "film strip" referred to in the specification includes such a possibility.

SUMMARY OF THE INVENTION

It is an object of the present invention to provide a camera in which the winding direction of a roll film (such as a Brownie film) with a bar code can be changed and the bar code can be reliably read in any winding direction so as to carry out various setting operations.

To achieve the object mentioned above, according to the present invention, there is provided a camera for receiving a roll film that is provided with a separate film strip wound around a first spool, and a second spool. The strip being provided with an identification mark, on one half of the width of the film strip. The camera includes: a first and second spool compartment, wherein the roll film can be loaded into either the first or second spool compartments and the second spool can be loaded into either the second or first spool compartments, respectively; a reversible film winding mechanism that winds the film strip of the roll film onto the second spool, wherein the film winding direction can be reversed depending on which one of the first and second spool compartments the roll film is loaded into; and a pair of code sensors, wherein at least one code sensor of the pair of code sensors corresponds to the identification mark, regardless of the winding direction of the film.

Preferably, the identification mark includes a bar code.

Preferably, the identification mark includes the following data: type of film, ISO speed, and data indicating whether the film is monochrome or color.

According to another aspect of the present invention, there is provided a camera using a roll film that is provided with a separate film strip having an identification mark, on one half of the width of the film strip. The camera includes a pair of spool compartments; the film strip is wound onto one spool and can be loaded into one of the pair of spool compartments; and the film strip which is wound onto one spool and loaded into one spool compartment can be wound onto another spool loaded into the other spool compartment; and the camera is provided a pair of code sensors, wherein at least one code sensor of the pair of code sensors corresponds to the identification mark regardless of the winding direction of the film.

Preferably, the code sensors are located at positions corresponding to opposite portions of the roll film with respect to a straight line which passes through a center of an aperture formed in the camera, which defines a photographing frame, the straight line being parallel with the film winding direction.

Preferably, the code sensors are located at a position diagonally opposed on opposite sides of the straight line.

Preferably, the code sensors are both located on one side of an aperture formed in the camera. The code sensors lie on a straight line which does not pass through the aperture.

Preferably, the spool compartments are each provided with a film sensor which detects the presence of the roll film loaded in the spool compartments, the camera further including: a film winding device for winding the film loaded in one of the spool compartments into the other spool compartment in accordance with the detection outputs of the film sensors; and a selecting device for selecting one of the code sensors in accordance with the detection outputs of the film sensors.

Preferably, the camera also includes an initialization device for determining photographing conditions such as the film speed or the number of the frames of the loaded roll film in accordance with signals read from the identification mark by the code sensors.

Preferably, the camera also includes a pulse generator circuit which generates pulse signals in accordance with the winding operation of the loaded roll film, and a decoder which reads identification mark using the code sensors, in synchronization with the pulse signals generated from the pulse generator circuit.

Preferably the roll film is a Brownie film, the identification mark is a bar code, and the code sensor is a bar code sensor.

According to another aspect of the present invention, there is provided a camera including: a first and a second spool compartment wherein a first spool can be loaded into either the first or second compartments and a second spool can be loaded into the second or first compartments, respectively; the first spool includes a roll film that is provided with a film strip wound around the first spool, and the film strip can be unwound from the first spool and wound onto the second spool; the film strip includes an identification mark located at a position on one half of the width of the film strip; a first code sensor for detecting the identification mark when the first and second spools are loaded into the first and second compartments, respectively; and a second code sensor for detecting the identification mark when the first and second spools are loaded into the second and first compartments, respectively.

Preferably, the identification mark includes the following data: type of film, ISO speed, and data indicating whether the film is monochrome or color.

Preferably, the roll film is a Brownie film, the identification mark is a bar code, and the code sensor is a bar code sensor.

The present disclosure relates to subject matter contained in Japanese Patent Application No. 10-91292 (filed on Apr. 3, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
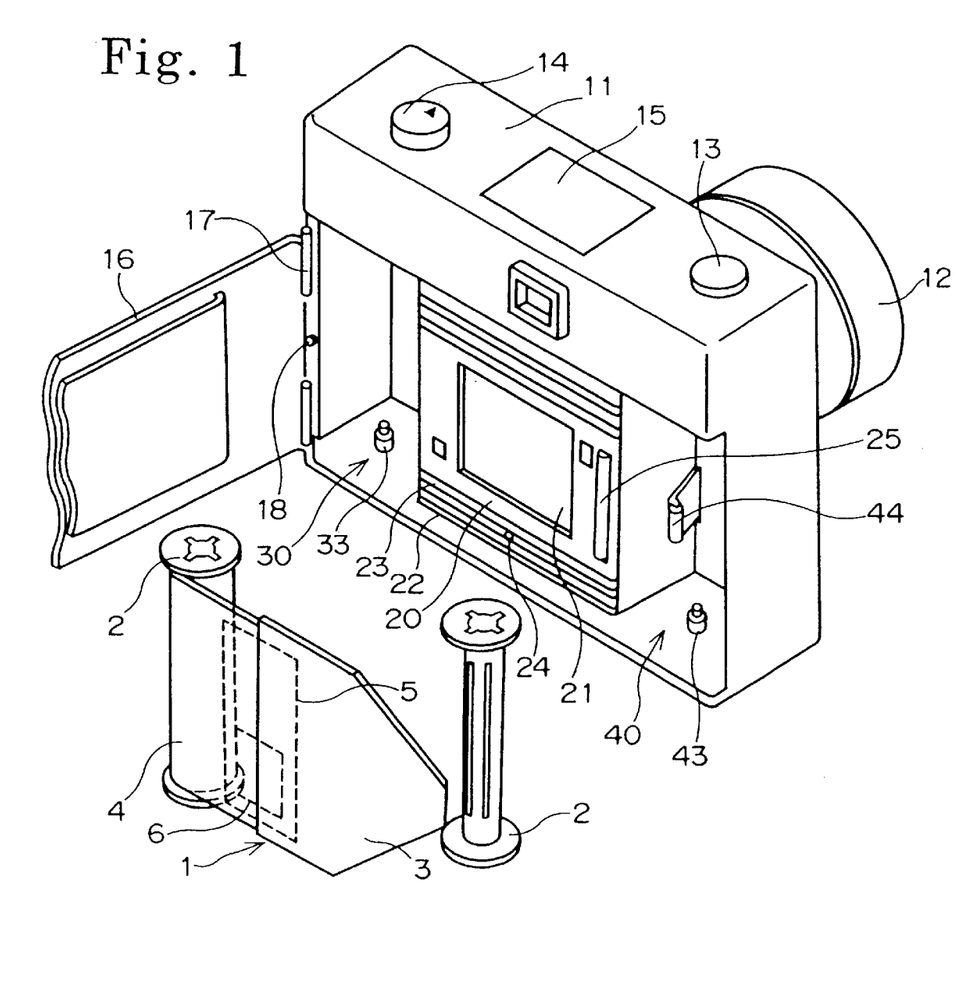
FIG. 1 is a perspective view of a camera according to an embodiment of the present invention.

FIG. 1 shows a perspective view of a camera using a Brownie film according to an embodiment of the present invention. A photographing lens 12 is mounted to a front surface of a camera 11. There is a release button 13 as a release switch, a main switch 14 which is actuated to turn the power source ON or OFF, and an LCD (indicator) 15, on the upper surface of the camera 11. A rear cover 16 is connected to the rear surface of the camera 11 through a hinge 17, so that when the rear cover 16 is open, a film can be loaded in or removed from the camera 11. A rear cover switch 18 is provided, which is turned ON when the rear cover is closed, to detect the open or closed state of the rear cover. In the camera 11, a Brownie film 1 which is provided with a spool 2 and a film element 3 wound onto the spool 2, and is held by a backing paper strip 4, as shown in FIG. 9. The Brownie film 1 is provided, on the leading end thereof, with a bar code (identification mark) 6.

Figure 2:
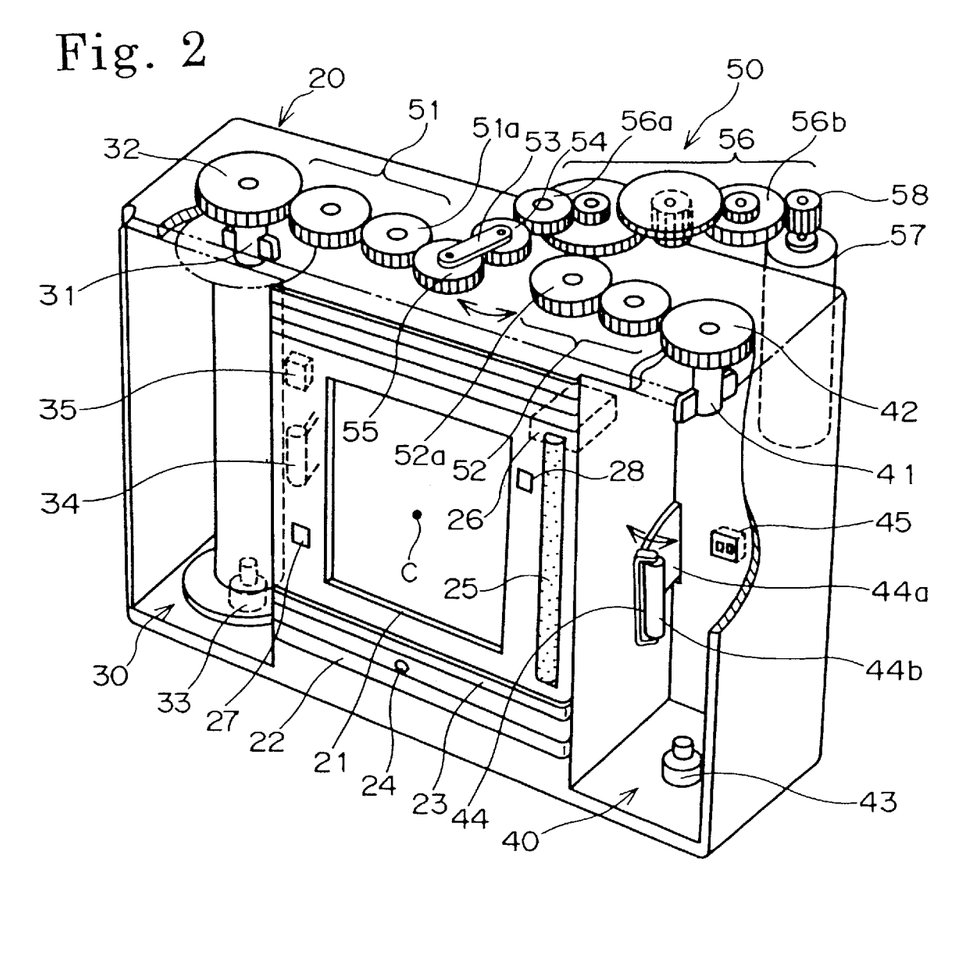
FIG. 2 is a perspective view of a camera body of a camera shown in FIG. 1.

FIG. 2 shows a perspective view of a camera body 20 when the rear cover 16 is open. The camera body 20 is provided on its rear surface with an aperture 21 which defines a photographing frame, at the substantially central portion of the rear surface. Pairs of outer and inner rails 22 and 23 which extend in the film feed direction are provided above and below the aperture 21. There is a first spool compartment 30 and a second spool compartment 40 on opposite sides of the aperture 21 in the lateral direction. Note that a data light emitter 24 is provided between the lower outer rail 22 and the lower inner rail 23, provided below the aperture 21, at the median position in the lateral direction (horizontal direction) to expose a shutter speed, a diaphragm value, or other photographing data onto the film portion out of the photographing frame. A friction roller 25 which will be discussed hereinafter is provided on the portion of the aperture 21 adjacent the second spool compartment 40. An electronic circuit unit (not shown in FIG. 1) including a control circuit is incorporated in the camera body 20 to perform a general control of the camera including a control of a film winding motor which will be discussed hereinafter.

The following is a detailed explanation of the reversible film winding mechanism (device) used in the camera. A film winding mechanism (film winding device) 50 is incorporated in the camera body 20. Namely, a first spool rotating shaft 31 and a second spool rotating shaft 41 are rotatably supported on the upper surfaces of the first spool compartment 30 and the second spool compartment 40 provided in the camera body 20 so as to engage with the spools (first and second spools) 2 of the Brownie film to thereby rotate the same in the same direction. The first and second spool rotating shafts 31 and 41 are provided on their upper ends with gears 32 and 42 which are in mesh with first and second driven gear trains (a pair of drive gear mechanisms) 51 and 52, each consisting of a plurality of gears (e.g., two gears) arranged along a line, respectively. The first gears 51a and 52a of the first and second driven gear trains 51 and 52 are spaced from one another at a predetermined space at the substantially median position of the aperture in the film feed direction. A swing arm 53 is supported on the upper surface of the camera body 20 at an intermediate position between the first gears 51a and 52a so as to swing about the single pivot end thereof in a plane same as the plane in which the first gears rotate. The swing arm 53 is provided on the pivot end thereof with a rotatable sun gear 54 and on the other end (free end) with a rotatable planet gear 55 which is always in mesh with the sun gear 54. The sun gear 54 is engaged by a terminal gear 56a of a drive gear train 56 consisting of a plurality of small diameter and large diameter gears. A first gear 56b of the drive gear train 56 is in mesh with a pinion 58 mounted to a drive shaft of the film winding motor 57. Note that in the illustrated embodiment, the first and second gear trains 51 and 52 and the gears 32 and 42 are identical, respectively. The gear trains 51 and 52 are arranged symmetrical with respect to the rotating shaft of the sun gear 54. Namely, the drive force of the film produced by the motor or the film winding speed is identical in either film winding direction. Consequently, a user would not recognize a difference in feeling between the film winding operations in opposite directions.

Figure 3A:
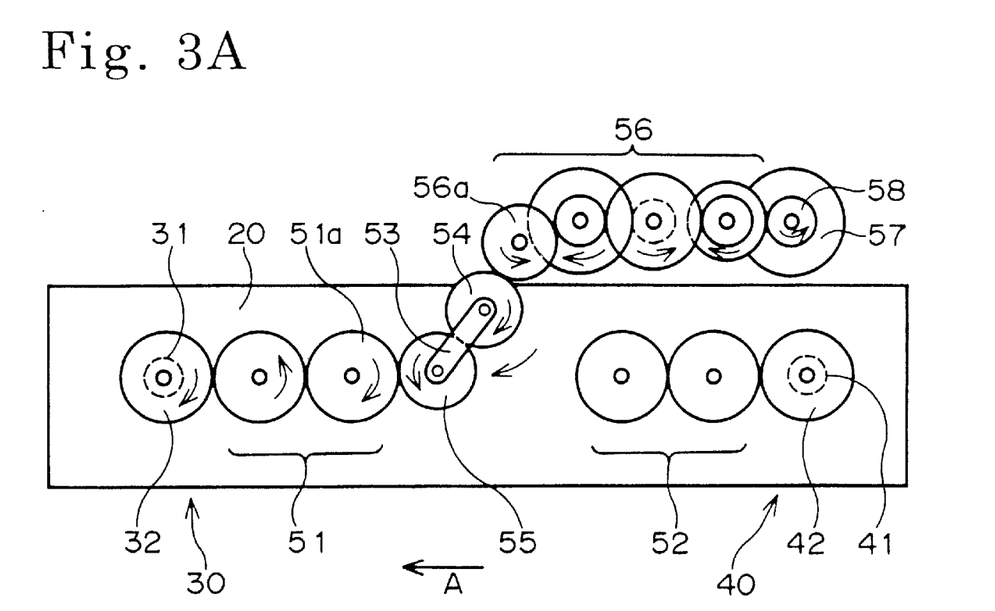
FIGS. 3A and 3B are plan views of a part of a camera body shown in FIG. 2 to explain an operation of a film winding mechanism.
Figure 3B:
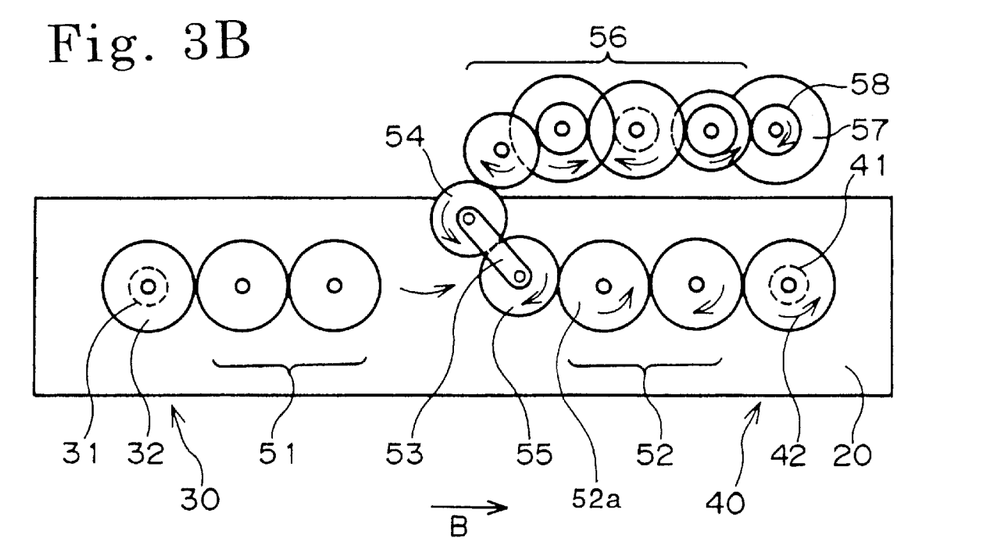

FIGS. 3A and 3B show plan views of the film winding mechanism 50 in different positions. On the assumption that the film winding motor 57 is rotated in the counterclockwise direction as shown in FIG. 3A, the rotational force is transmitted to the sun gear 54 through the pinion 58 and the drive gear train 56. Consequently, the sun gear 54 is rotated in the clockwise direction which is opposite to the rotation direction of the terminal gear 56a, due to the engagement of the terminal gear 56a of the drive gear train 56 and the sun gear 54, so that the swing arm 53 swings in the same direction. As a result of the swing movement of the swing arm 53, the planet gear 55 engages with the first gear 51a of the first gear train 51, so that the rotational force of the sun gear 54 is transmitted to the first gear train 51. Consequently, the gear 32 which is in mesh with the first gear train 51 is rotated in the clockwise direction to thereby rotate the first spool rotating shaft in the clockwise direction. Consequently, the film is wound in the direction toward the first spool compartment, i.e., in the direction "A" in FIG. 3A.

If the film winding motor 57 is rotated in the clockwise direction as shown in FIG. 3B, the sun gear 54 is rotated in the counterclockwise direction by the drive gear train 56, so that the swing arm 53 swings in the same direction. As a result, the planet gear 55 engages with the first gear 52a of the second gear train 52, so that the gear 42 which is in mesh with the second gear train 52 is rotated in the counterclockwise direction to thereby wind the film in the direction toward the second spool compartment, i.e., in the direction "B" in FIG. 3B. Namely, in the film winding mechanism 50, one of the first and second spool rotating shafts 31 and 41 can be selectively rotated by reversing the rotation of the film winding motor 57. Note that when one of the spool rotating shafts (31 or 41) is rotated, since the gear train which is engaged by the other spool rotating shaft is disengaged from the planet gear 55, the other spool rotating shaft and the gear train associated therewith are free to rotate.

As can be seen in FIG. 2, spool support shafts 33 and 43 are secured to the lower surfaces of the first and second spool compartments 30 and 40 and are aligned with the axes of the spool rotating shafts 31 and 41, respectively. The first and second spool rotating shafts 31 and 41 and the spool support shafts 33 and 43 make it possible to rotatably support the spools (first and second spools) 2 loaded in the spool compartments 30 and 40. The spool rotating shafts 31 and 41 are spaced from the median of the aperture 21 in the lateral direction at an equi-distance, i.e., the spool rotating shafts 31 and 41 are arranged in a line-symmetry with respect to the median line of the aperture 21. The spool compartments 30 and 40 are respectively provided on their inner wall surfaces with film pressing rollers 34 and 44 which are brought into elastic contact, in the radial direction, with the outer surface of the film which is wound by one of the spools to thereby prevent the film from being loosened. The film pressing rollers 44 (and 34) are each provided with a roller element 44b which is rotatably supported at front end of an elastically deformable arm 44a which is secured at its one end to the camera body, so that the roller element 44b can be brought into elastic contact with the film surface due to the resilience of the elastically deformable arm 44a.

The spool compartments 30 and 40 are also provided on their inner wall surfaces with photo reflectors 35 and 45 which serve as film sensors, corresponding to the spools loaded in the respective spool compartments. The photo reflectors 35 and 45 are identical and are each provided therein with a light emitting diode LED and photo diode PD, similar to a bar code sensor which will be discussed hereinafter. Light emitted from the light emitting diode LED is reflected by the outer surface of the film 3 loaded in the spool compartment and is received by the photo diode PD, so that the sensor 35 (45) is turned ON. Consequently, it can be detected by the sensor that the film 4 is loaded in the spool compartment or that the film is wound around the spool 2 provided in the spool compartment.

The friction roller 25 which is provided between the aperture 21 and the second spool compartment 40 is brought into contact with the surface of the film which is wound, so that the friction roller 25 (i.e., the shaft of the friction roller) is rotated due to the friction caused by the movement of the film during the winding operation. The friction roller 25 is provided on its one end with a pulse generator (circuit) 26 which generates pulse signals in accordance with the rotation of the friction roller 25 (shaft thereof). The pulse generator 26 can include, for example, a magnet (not shown) which is rotated in accordance with the rotation of the shaft of the friction roller 25 and a Hall element (not shown) disposed in the vicinity of the magnet, so that the power produced by the Hall element due to a change in the magnetic flux density in accordance with the rotation of the magnet is output as pulse signals. Alternatively, the pulse generator can be composed of a light interception plate which is rotated in accordance with the rotation of the shaft of the friction roller 25 and a photo detector having sensor elements disposed on opposite sides of the light interception plate, so that pin holes formed in the light interception plate can be detected by the photo detector which generates pulse signals. Consequently, the amount of rotation of the friction roller 25, i.e., the amount of the winding of the film is detected by counting the number of pulses output from the pulse generator 26.

Figure 4A:
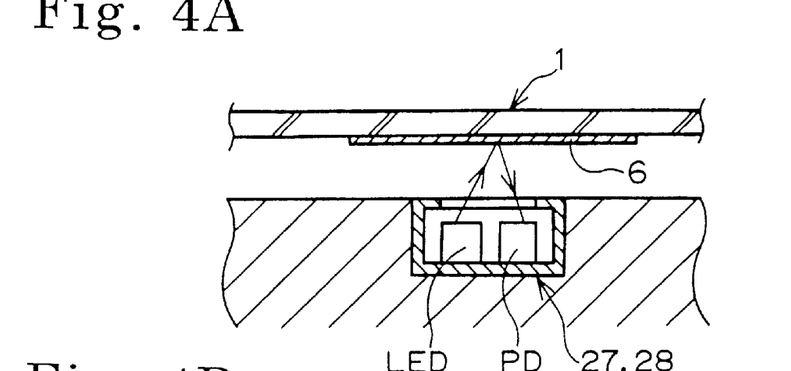
FIGS. 4A and 4B are a sectional view and a diagram of a bar code sensor, respectively, to explain an operation thereof.
Figure 4B:
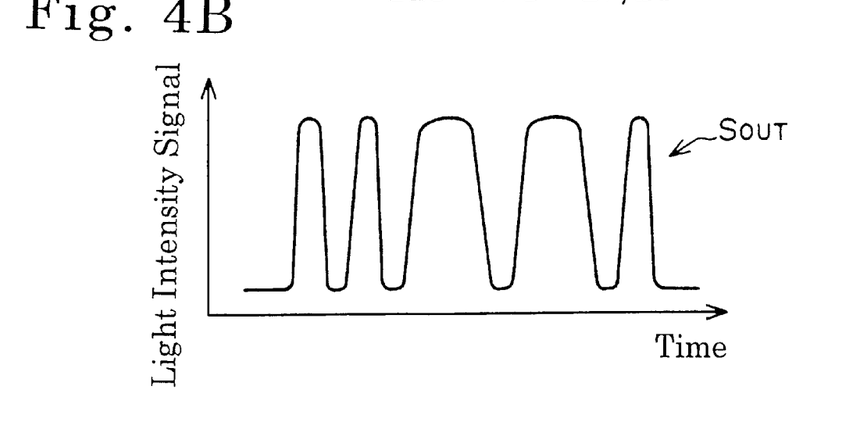

First and second bar code sensors (code sensors) 27 and 28 are provided on the rear surface of the camera body and between the aperture 21 and the first spool compartment 30 and between the aperture 21 and the second spool compartment 40, respectively. The first bar code sensor 27 between the aperture 21 and the first spool compartment 30 is located substantially at a median point of the lower half portion of the rear cover located below the lateral center line of the aperture 21. The second bar code sensor 28 between the aperture 21 and the second spool compartment 40 is located substantially at a median point of the upper half portion of the rear cover located above the lateral center line of the aperture 21. The first and second bar code sensors 27 and 28 are laterally spaced at an equi-distance from the vertical center line of the aperture 21; i.e., are arranged symmetrically with respect to the center point C of the aperture 21. The first and second bar code sensors 27 and 28 are each made of an infrared photoreflector per se known, using light (usually infrared light) of a wavelength band to which the film is not sensitive. For example, as shown in FIG. 4A, infrared radiation emitted from the built-in infrared LED is incident upon the bar code 6 and the light reflected by the bar code 6 is received by the photo diode PD. When the film is wound, the bar code 6 is moved across the bar code sensors 27 or 28, so that the photo diodes PDs of the bar code sensors detect the intensity of the reflected light which varies depending on the bar code pattern. The intensity signals SOUT (see FIG. 4B) thus detected are output as bar code signals.

Figure 5:
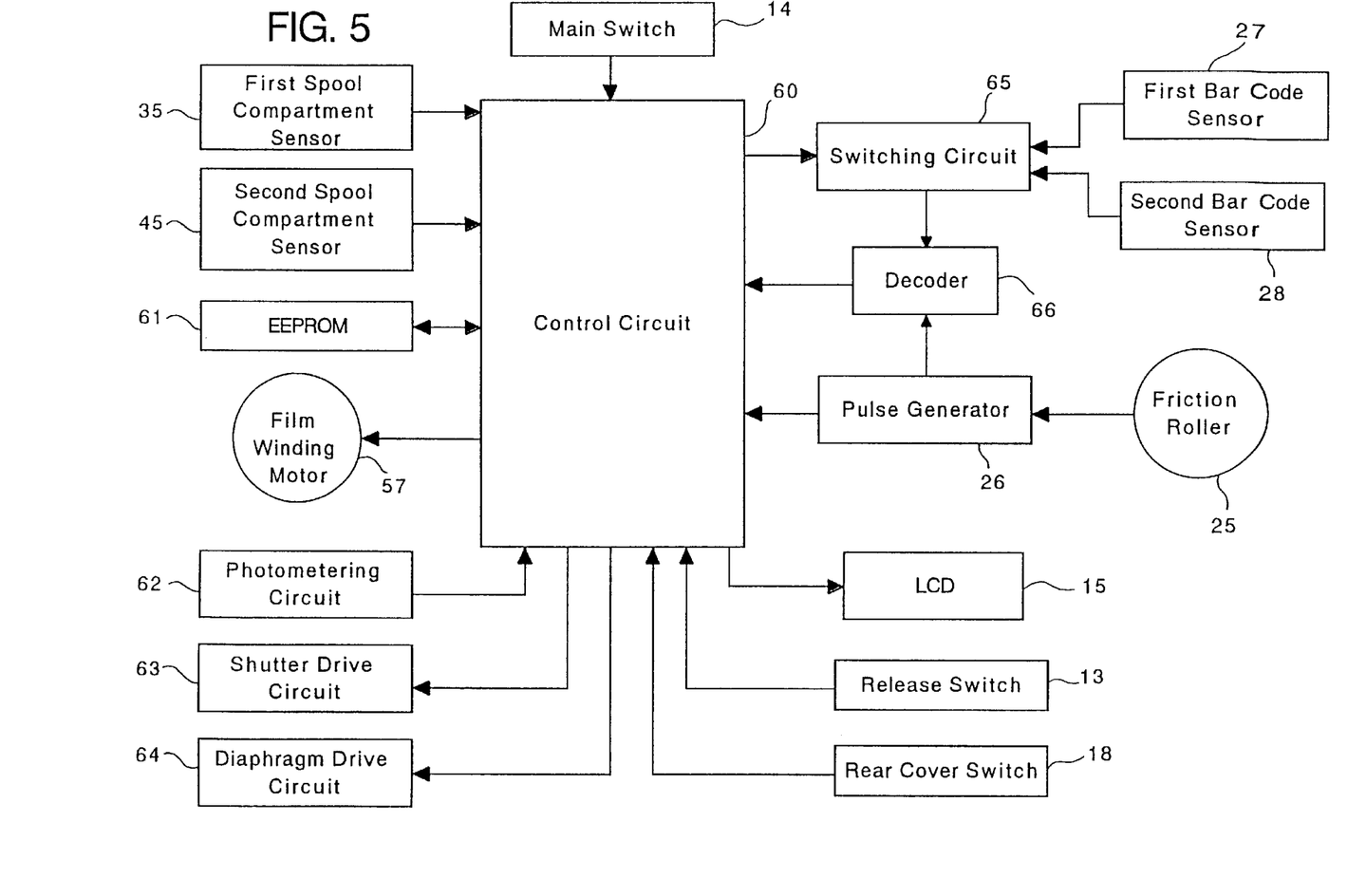
FIG. 5 is a circuit block diagram of an electronic circuit unit.

FIG. 5 shows a block diagram of an internal structure of the electronic circuit unit provided in the camera body.

The ON/OFF data of the various switches including the main switch 14, the rear cover switch 18, and the release switch 13, etc., is input to the control circuit 60. The detection signal which is issued when it is detected by the first or second spool sensor 35 or 45 that the film is loaded in the first or second spool compartment is also supplied to the control circuit 60. The pulse signals which are generated by the pulse generator 26 in accordance with the rotation of the friction roller 25 during the film winding operation are also input as a film winding amount signal to the control circuit 60. The control circuit 60 performs a predetermined arithmetic operation, based on the above-mentioned signals input thereto; reads/writes the data from or into the EEPROM 61; and controls the rotation of the film winding motor 57 in accordance with the calculation results. The first and second bar code sensors 27 and 28 are selectively connected to the decoder 66 by a switching circuit (selecting device) 65 which operates in accordance with the signal from a controller (initialization device) 60, so that the signals read from the bar code sensors 27 and 28 are decoded by the decoder 66 and input to the controller 60. The decoder 66 is constructed so that the timing of the decoding operation is determined in accordance with the pulse signals generated from the pulse generator 26. The LCD 15 is connected to the control circuit 60 so as to indicate necessary information. To the control circuit 60 are connected a photometering circuit 62, a shutter drive circuit 63 and a diaphragm drive circuit 64, for the photographing operation of the Brownie film, though no detailed explanation therefor will be given herein.

In the camera constructed as above, if the film loaded in the first or second spool compartment 30 or 40 has been completely exposed in the previous photographing operation, the film has been entirely wound onto the spool in the second or first spool compartment, respectively. Therefore, the spool in the first or second spool compartment is vacant of film. For a subsequent photographing operation, the exposed film in the second or first spool compartment is removed and a new film is loaded in the second or first spool compartment, respectively. Thereafter, the holes formed at the leading end of the new film are engaged by the hooks (not shown) of the spool in the vacant spool compartment. The film which has been loaded in the spool compartment is detected by the spool sensor 35 or 45. The detection is supplied to the controller 60. The controller 60 determines the winding direction and drives the film winding mechanism 50 and selects the bar code sensor 27 or 28 corresponding to the spool compartment in which the film has been loaded. Consequently, the bar code 6 of the film is read by the bar code sensor 27 or 28 so that the controller 60 can perform various setting operations in accordance with the read bar code data. Thus, optimum photographing data can be automatically obtained for the loaded film.

The operation of the camera will be discussed below, referring to the flow charts shown in FIGS. 6 and 7.

The main operation (S100) begins when the main switch 14 is turned ON (S101). The control circuit 60 reads the winding direction flag FW, the film loading completion flag FL, and the film loading flag FS, stored in the EEPROM 61 (S102). Thereafter, the loading operation is carried out (S200). In the loading operation, as shown in FIG. 7, the re-closure of the rear cover 16 which has been opened for the film replacement is detected when the rear cover switch 17 is turned ON from OFF (S201). Whether the film is loaded in the first spool compartment 30 or in the second spool compartment 40 is detected by the spool compartment sensors (photo reflectors) 35 and 45 provided in the respective spool compartments (S202). Namely, if both the spool compartment sensors 35 and 45 are OFF, no film is loaded. Consequently, the controller 60 sets the film loading flag FS=0 and the control is returned to the main operation (S203).

If one of the spool compartment sensors 35 and 45 is turned ON, the state of the first spool compartment sensor 35 is judged (S204), If the first spool compartment sensor 35 is OFF, it is judged that the film is loaded in the second spool compartment 40, so that the controller 60 sets the winding direction flag FW=0 to set the winding direction of the film toward the first spool compartment 30 from the second spool compartment 40 (S205). The switching circuit is controlled to select the second bar code sensor 28 (S206). If the first spool compartment sensor 35 is ON, a check is made to determine whether the second spool compartment sensor 45 is OFF. If the second spool compartment sensor 45 is OFF (S207), the controller 60 sets the winding direction flag FW=1 to set the winding direction of the film toward the second spool compartment 40 from the first spool compartment 30 (S208). The switching circuit is controlled to select the first bar code sensor 27 (S209). The selected bar code sensors are located on the right side of the film width in the direction of the movement of the film when the film is wound. Therefore, the selected bar code sensor is always opposed to the bar code when the film is wound. Note that if both the first and second spool compartment sensors 35 and 45 are ON at step S207, whether or not the film has been loaded (i.e., whether the loading completion flag FL is FL=1) is checked (S210). If FL=1, the control is returned to the main operation. If FL=0, (e.g., an error operation), the indication operation of the LCD is carried out to display a warning (S211). Thereafter, the control is returned to the main operation.

The film loading flag FS is set 1 (FS=1) at step S212, and the pulse counter C is set 0 (C=0) at step S213. Thereafter, the control circuit 60 drives the film winding motor 57 in accordance with the value of the winding direction flag FW (S214). Namely, if FW=1, the film winding motor 57 is driven in the direction to wind the film into the second spool compartment 40. For example, in the arrangement shown in FIG. 3B, the film winding motor 57 is rotated in the clockwise direction. Consequently, the planet gear 55 which is swung by the sun gear 54 through the drive gear train 56 is engaged with the second gear train 52, so that the first spool rotating shaft 41 in the second spool compartment is rotated in the counterclockwise direction. As a result, the film in the first spool compartment 30 is wound onto the spool in the second spool compartment 40 in the direction "B". During the winding operation, the bar code 6 is read by the first bar code sensor 27. If FW=0, the film is wound in the direction "A" into the first spool compartment 30, as shown in FIG. 3A, and the bar code 6 is read by the second bar code sensor 28 the during winding operation of the film.

Consequently, the friction roller 25 is rotated in accordance with the winding operation of the film, so that pulses are generated by the pulse generator 26. If the controller 60 detects pulses (S215), the number of pulses is counted. If one pulse is counted, C is set to be C=(C+1) at step S216. At the same time, the bar code is read by the selected bar code sensor and the read data is decoded by the decoder (S217). A check is made to determine whether the film is wound by an amount corresponding to the length of the bar code based on the counted number of pulses (i.e., whether or not the decoding operation of the bar code is completed) (S218). If the decoding operation is not completed, the operations from step S214 to S217 are repeated. If the decoding operation is completed, the controller 60 determines the kind of the film, the ISO speed, color or monochrome, based on the decoded data. The controller 60 subsequently performs the setting operations corresponding to the loaded film, for the photometering circuit 62, the shutter drive circuit 63, and the diaphragm drive circuit 64. At the same time, the controller 60 performs the indication operation to indicate the necessary information in the LCD 15 (S219).

The controller 60 repeats the counting operation of the number of pulses generated by the pulse generator 26 and detects when a predetermined amount of film has been wound in accordance with the counted number of pulses. Consequently, the completion of the loading is detected (S220), and thereafter, the loading completion flag FL is set FL=1 (S221) to stop the film winding motor (S222). Thus, the loading operation is completed (S200) and the control is returned to the main operation.

Figure 6:
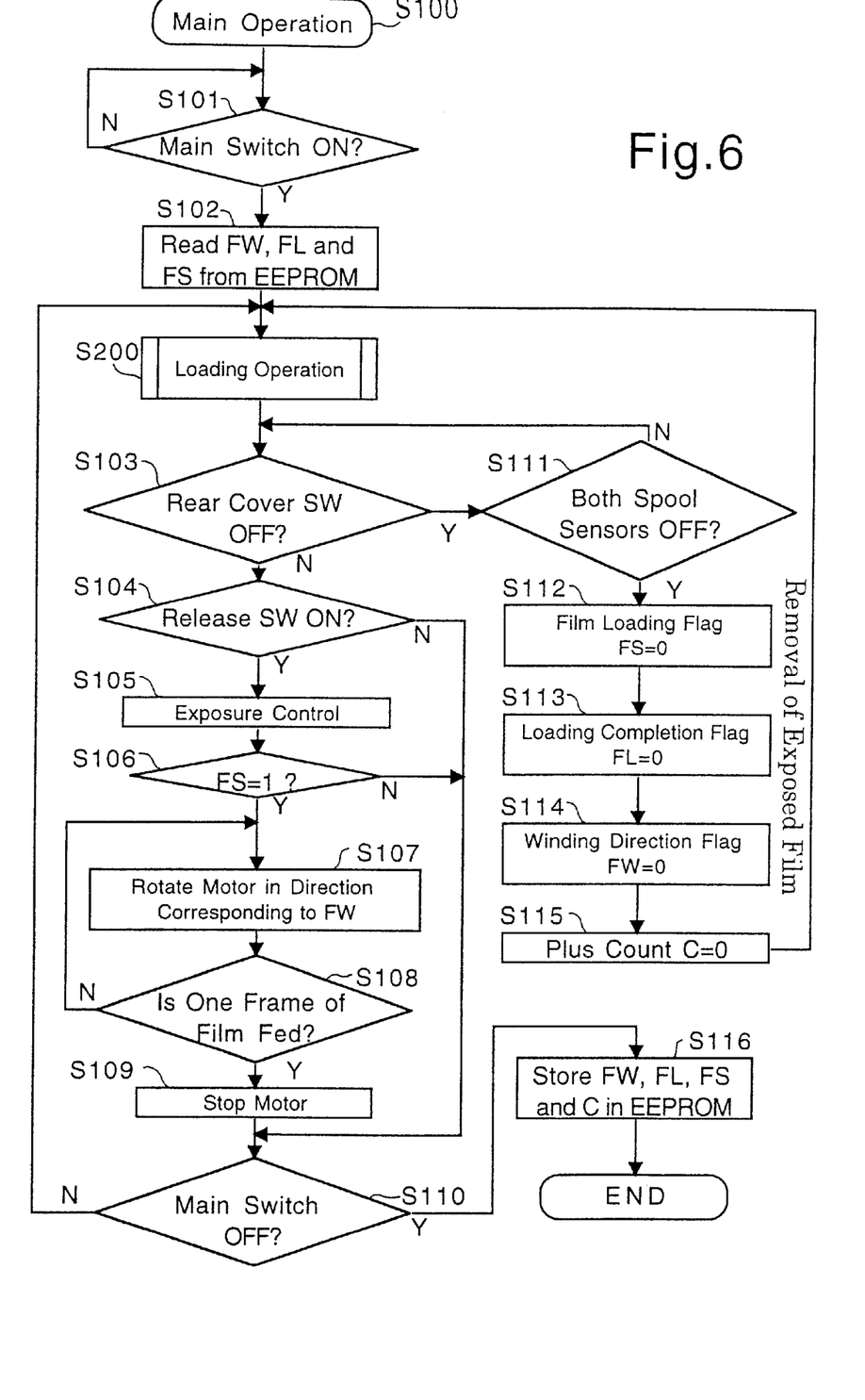
FIG. 6 is a flow chart of a main operation of a camera according to the present invention.
Figure 7:
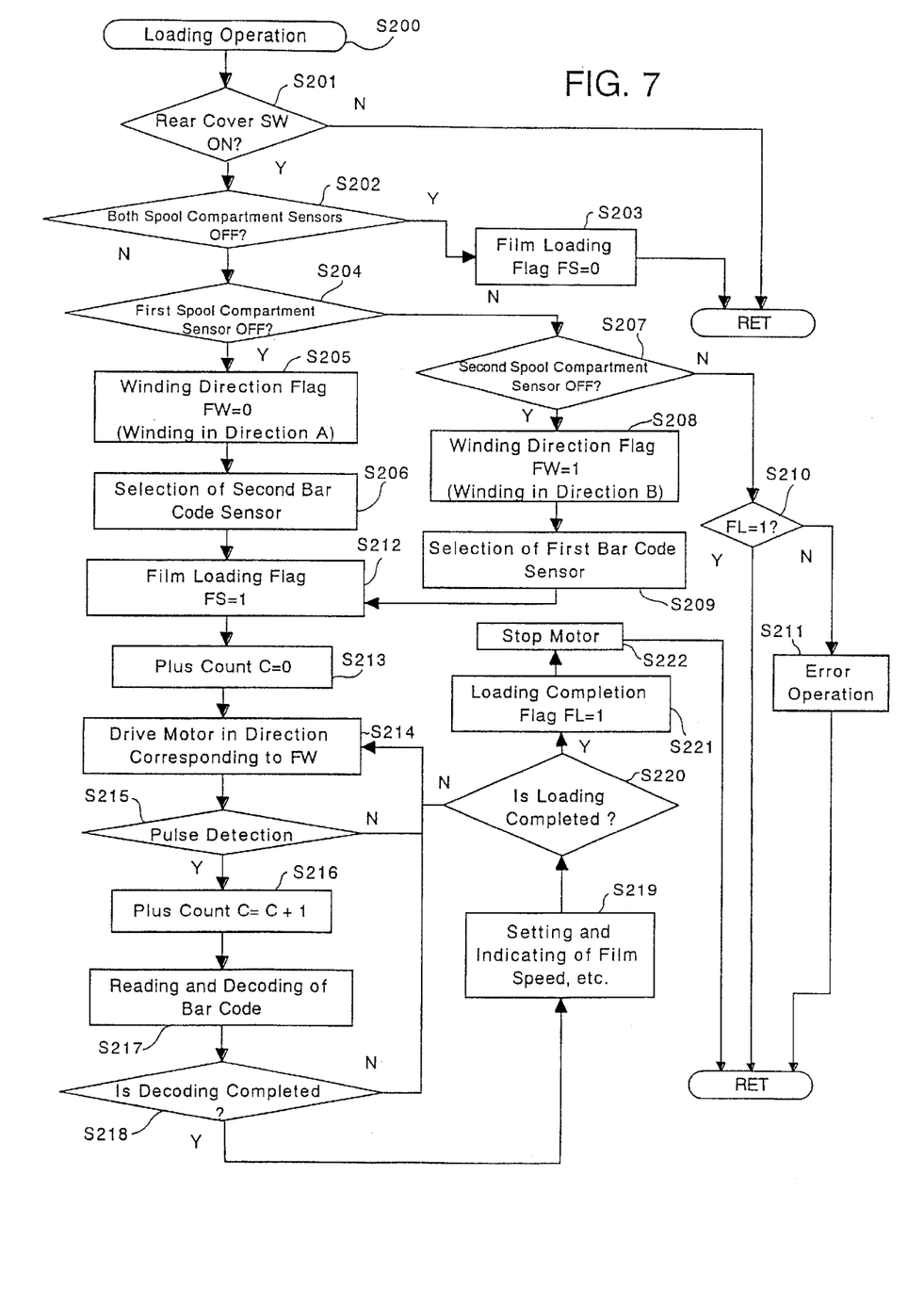
FIG. 7 is a flow chart of a film loading operation in a camera according to the present invention.

If the loading operation is completed in FIG. 6 (S200), the controller 60 judges the state of the rear cover switch 18 (S103). If the rear cover switch 18 is not turned OFF (from ON), so that the rear cover is closed, whether the release switch 13 is turned ON is checked (S104). If the release switch 13 is turned ON, the exposure operation is carried out (S105). Thereafter, if the film loading flag FS is 1 (FS=1), the photographing operation is carried out (S106). Thereafter, the film winding motor 57 is rotated in the direction corresponding to the value of the winding direction flag FW (S107). The winding of the film by one frame is detected in accordance with the number of pulses generated from the pulse generator 26 in accordance with the rotation of the friction roller 25 (S108). Thereafter, the film winding motor 57 is stopped (S109).

Note that if the film loading flag FS is 0 (FS=0) after the exposure operation (S105), no film is loaded and hence no film winding operation is carried out to reduce the power consumption of the battery. If the main switch 14 is ON (S100), the control proceeds to step S200 (loading operation). As mentioned above, if the loading operation has been completed, the control skips the loading operation and proceeds to the photographing operation for the next film frame.

If the rear cover switch 18 is turned OFF from ON at step S103, i.e., if the rear cover 16 is open, whether or not both the spool compartment sensors 35 and 45 are turned OFF is checked to judge whether the photographing operation for all the film frames has been completed so that the film has been unloaded (S111). If both the spool compartment sensors 35 and 45 are OFF, the film loading flag FS=0, the loading completion flag FL=0, and the winding direction flag F=0 are set (S112 to S114). Also, the pulse count C=0 is set (S115), and the control is returned to the loading operation S200.

If the spool compartment sensor 35 or 45 is not OFF, i.e., if one or both of the spool compartment sensors 35 and 45 is or are ON, the film is loaded and hence the loop of operations at steps S103 and S111 is repeated until the film is unloaded. Consequently, if the rear cover 16 is opened and is closed again without removing the film, it is possible to prevent the controller 60 from incorrectly judging that a new film is loaded and from carrying out the photographing operation for the exposed film. Moreover, if the main switch 14 is turned OFF at step S110, the control circuit 60 stores the values of the flags FS, FL and FW, and the counted number C of pulses (S116) in the EEPROM 61.

As may be understood from the above discussion, when the film is loaded in either the first and second spool compartments 30 and 40, the film is detected by the spool compartment sensors 35 and 45, so that not only can the film winding direction be automatically set, but also one of the bar code sensors 27 and 28 can be automatically selected. Thus, the bar code can be read in accordance with the loading or winding operation of the film. Consequently, not only can film replacement be facilitated, the photographing data setting operation can also be automatically carried out using the bar code. Namely, it is not necessary for a photographer to manually set the photographing conditions.

Figure 8A:
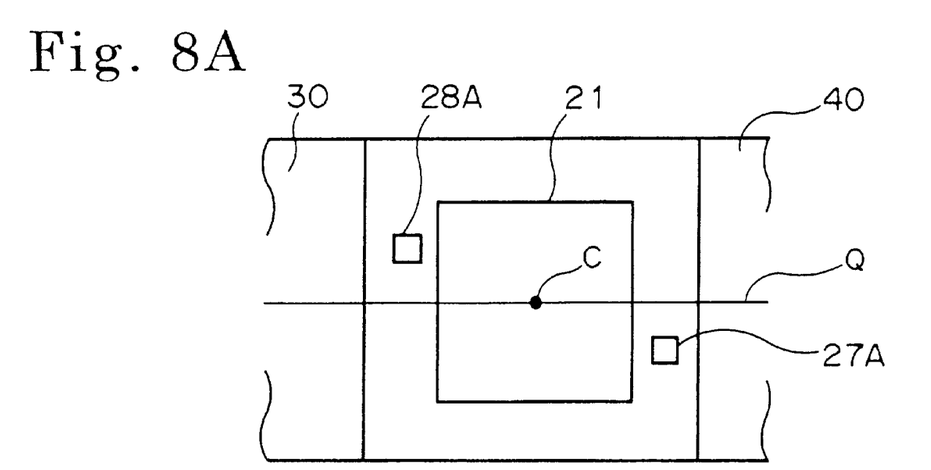
FIGS. 8A, 8B and 8C are sectional views of different examples of a bar code sensor.
Figure 8B:
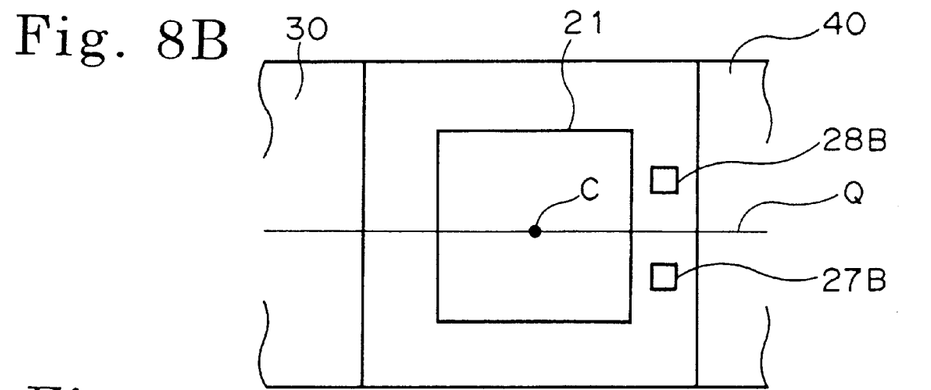
Figure 8C:
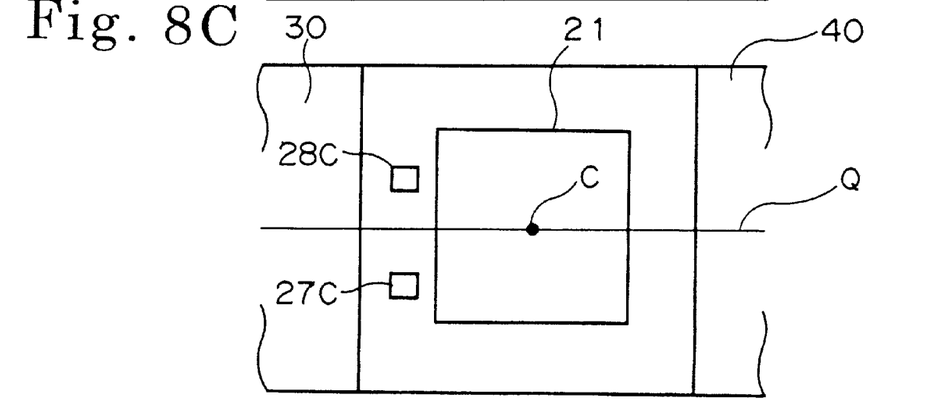

The bar code can be read regardless of the winding direction of the Brownie film, so long as the first and second bar code sensors are located on opposite sides of the aperture in the lateral direction. However, the arrangement of the first and second bar code sensors can be modified. Namely, as shown in FIG. 8A, the first and second bar code sensors 27A and 28A can be diagonally arranged, wherein the diagonal arrangement is opposite to the diagonal arrangement in FIG. 1. Alternatively, as shown in FIGS. 8B or 8C, the first and second bar code sensors 27B or 27C and 28B or 28C can be disposed on the same lateral side (right side or left side) of the aperture 21 and on opposite sides of the longitudinal center line of the film. In these alternatives, the bar code sensors are located in line-symmetry with respect to the line Q passing through the center C of the aperture or in point-symmetry with respect to the center point C of the aperture 21.

As may be understood from the foregoing, according to the present invention, in a camera using a Brownie film with a bar code provided on an upper or lower half of the film in the width direction thereof, the film can be loaded in either spool compartment of a pair of spool compartments and the film loaded in one spool compartment can be wound into the other spool compartment. Moreover, provided is made of bar code sensors on opposite sides of the longitudinal center line of the Brownie film in the width direction to read the bar code. Consequently, the bar code of the Brownie film can be reliably detected regardless of the selected spool compartment in which the film is loaded or the winding direction of the film. Thus, the initialization of the camera including the setting of the kind of the film or the film speed, etc., can be automatically carried out. Moreover, the spool compartments are provided with film sensors which detect the presence or absence of the film therein, so that the film winding direction and the selection of the bar code sensor to be used can be automatically determined in accordance with the detection results of the film sensors. Consequently, a camera in which the initialization of the camera and the setting of the photographing conditions can be automatically carried out when the film is loaded, thus resulting in an easy film replacement process and subsequent photographing operation.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera for receiving a roll film that is provided with a film strip wound around a first spool and a second spool, said film strip being provided with an identification mark on one half of the width of the film strip, said camera comprising:

first and second spool compartments configured so that the first spool can be loaded into either said first or second spool compartments and said second spool can be loaded into either said second or first spool compartments, respectively;

a reversible film winding mechanism that is configured to wind the film strip of said roll film onto said second spool, wherein the film winding direction can be reversed depending on into which one of said first and second spool compartments the roll film is loaded; and a pair of code sensors that are provided so that one code sensor of said pair of code sensors corresponds to said identification mark, regardless of the winding direction of said film.

2. A camera according to claim 1, wherein said identification mark comprises a bar code.

3. A camera according to claim 1, wherein said identification mark comprises at least one of the following data: type of film, ISO speed, and data indicating whether the film is monochrome or color.

4. A camera using a roll film that is provided with a film strip comprising an identification mark on one half of the width of the film strip, wherein:

said camera comprises a pair of spool compartments;

the film strip is wound onto a spool, the pair of spool compartments being configured so that the film strip can be loaded into one of said pair of spool compartments; and the film strip which is wound onto one spool and loaded into one spool compartment of said pair of spool compartments can be wound onto another spool loaded into the other spool compartments of said pair of spool compartments; and said camera is provided a pair of code sensors, wherein one code sensor of said pair of code sensors is positioned to correspond to said identification mark regardless of the winding direction of said film.

5. A camera according to claim 4, wherein said code sensors are located at positions corresponding to opposite portions of the roll film with respect to a straight line which passes through a center of an aperture formed in said camera, which defines a photographing frame, said straight line being parallel with the film winding direction.

6. A camera according to claim 5 wherein said code sensors are positioned diagonally opposed to each other on opposite sides of said straight line.

7. A camera according to claim 4, wherein said code sensors are both located on one side of an aperture formed in said camera, wherein said code sensors lie on a straight line which does not pass through said aperture.

8. A camera according to claim 4, wherein said spool compartments are each provided with a film sensor which detects the presence of the roll film loaded in the spool compartments, said camera further comprising:

a film winding device that is configured to wind the film loaded in one of the spool compartments into the other spool compartment in accordance with the detection outputs of said film sensors; and a selecting device that selects one of said code sensors in accordance with the detection outputs of said film sensors.

9. A camera according to claim 4, further comprising an initialization device that determines photographing conditions, the photographing conditions comprising at least one of the film speed and the number of frames of the loaded roll film in accordance with signals read from the identification mark by said code sensors.

10. A camera according to claim 4, further comprising a pulse generator circuit which generates pulse signals in accordance with the winding operation of the loaded roll film, and a decoder which reads the identification mark using said code sensors, in synchronization with the pulse signals generated by the pulse generator circuit.

11. A camera according to claim 4, wherein said roll film comprises one of 120 film and 220 film.

12. A camera according to claim 4, wherein said identification mark comprises a bar code.

13. A camera according to claim 4, wherein said code sensor comprises a bar code sensor.

14. A camera comprising:

a first and a second spool compartment configured such that a first spool can be loaded into either said first or second compartments and a second spool can be loaded into either said second or first compartments, respectively; wherein said first spool comprises a roll film that is provided with a film strip wound around said first spool, and said film strip can be unwound from said first spool and wound onto said second spool; wherein the film strip includes an identification mark located at a position on one half of the width of the film strip;

a first code sensor that detects the identification mark when the first and second spools are loaded into said first and second compartments, respectively; and a second code sensor that detects the identification mark when the first and second spools are loaded into said second and first compartments, respectively.

15. A camera according to claim 14, wherein said identification mark comprises at least one of the following data: type of film, ISO speed, and data indicating whether the film is monochrome or color.

16. A camera according to claim 14, wherein said roll film comprises one of 120 film and 220 film.

17. A camera according to claim 14, wherein said identification mark comprises a bar code.

18. A camera according to claim 14, wherein said code sensor comprises a bar code sensor.

* * * * *